United States Patent
Hodgson et al.

(10) Patent No.: US 12,136,408 B2
(45) Date of Patent: Nov. 5, 2024

(54) ACOUSTIC PANEL WITH 3D PRINTED CELL STRUCTURE SUPPORT LAYER

(71) Applicant: Rolls-Royce Corporation, Indianapolis, IN (US)

(72) Inventors: Benedict N. Hodgson, Indianapolis, IN (US); Jeff Higbie, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 253 days.

(21) Appl. No.: 17/661,435

(22) Filed: Apr. 29, 2022

(65) Prior Publication Data

US 2023/0351995 A1 Nov. 2, 2023

(51) Int. Cl.
| | |
|---|---|
| *G10K 11/168* | (2006.01) |
| *B32B 3/12* | (2006.01) |
| *B32B 27/28* | (2006.01) |
| *B33Y 10/00* | (2015.01) |
| *B33Y 70/00* | (2020.01) |
| *B33Y 80/00* | (2015.01) |
| *F02C 7/24* | (2006.01) |

(52) U.S. Cl.
CPC ............. *G10K 11/168* (2013.01); *B32B 3/12* (2013.01); *B32B 27/288* (2013.01); *B33Y 10/00* (2014.12); *B33Y 70/00* (2014.12); *B33Y 80/00* (2014.12); *B32B 2307/102* (2013.01); *B32B 2605/18* (2013.01); *F02C 7/24* (2013.01); *F05D 2260/96* (2013.01)

(58) Field of Classification Search
CPC ...... G10K 11/168; B33Y 10/00; B33Y 70/00; B33Y 80/00; B32B 3/12; B32B 27/288; B32B 2307/102; B32B 2605/18; F02C 7/24; F05D 2260/96
See application file for complete search history.

(56) References Cited

U.S. PATENT DOCUMENTS

| | | | |
|---|---|---|---|
| 10,783,869 B2 | 9/2020 | Alstad | |
| 10,808,399 B2 | 10/2020 | Alstad et al. | |
| 10,830,102 B2* | 11/2020 | Martin | B22F 5/009 |
| 11,034,460 B2 | 6/2021 | Renwick et al. | |

(Continued)

FOREIGN PATENT DOCUMENTS

WO 2022234228 A2 11/2022

OTHER PUBLICATIONS

Notice of Allowance from U.S. Appl. No. 17/651,021 dated Jan. 16, 2024, 8 pp.

(Continued)

*Primary Examiner* — Forrest M Phillips
(74) *Attorney, Agent, or Firm* — Shumaker & Sieffert, P.A.

(57) ABSTRACT

The disclosure describes acoustic panels (such as for gas turbine engines) and techniques for forming acoustic panels. In some examples, the acoustic panel comprises a coversheet comprising an outer face, an inner face, and a plurality of apertures extend from the outer face to the inner face. The acoustic panel also comprises a 3D printed support layer comprising a polymer and defining a plurality of cell openings, wherein a first side of the support layer opposite the cell openings is coincident with the inner face of the coversheet, and wherein the 3D printed support layer is 3D printed directly onto the inner face of the coversheet.

20 Claims, 6 Drawing Sheets

(56) References Cited

U.S. PATENT DOCUMENTS

| | | | |
|---|---|---|---|
| 11,092,077 B2* | 8/2021 | Joshi | B32B 15/20 |
| 11,195,504 B1* | 12/2021 | Hammetter | B33Y 80/00 |
| 2013/0048206 A1 | 2/2013 | Henkle et al. | |
| 2016/0152314 A1* | 6/2016 | Carlsten | C23C 18/1616 |
| | | | 244/119 |
| 2017/0058985 A1* | 3/2017 | Martino Gonzalez | B32B 3/12 |
| 2018/0018952 A1 | 1/2018 | Herrera | |
| 2019/0234313 A1* | 8/2019 | Kray | B22F 10/28 |
| 2020/0103139 A1 | 4/2020 | Schiller et al. | |
| 2023/0258132 A1 | 8/2023 | Hodgson et al. | |

OTHER PUBLICATIONS

Response to Office Action dated Sep. 25, 2023 from U.S. Appl. No. 17/651,021, filed Dec. 23, 2023, 9 pp.

Iervolino, "Additive Manufacturing of High Temperature Resistant Thermoplastic Composites and Sandwich Panels for Broadband Sound Absorption", Oct. 3, 2019, 3 pp., Retrieved from https://www.politesi.polimi.it/handle/10589/150010.

PlasticsToday Staff., "3D-Printed Metamaterial Could Lead to Lighter, Safer Cars", Feb. 10, 2021, 3 pp., Retrieved from www.PlasticsToday.com.

U.S. Appl. No. 17/651,021, filed Feb. 14, 2022, Hodgson et al.

Office Action from U.S. Appl. No. 17/651,021 dated Sep. 25, 2023, 9 pp.

Notice of Allowance from U.S. Appl. No. 17/651,021 dated Apr. 19, 2024, 7 pp.

* cited by examiner

ACOUSTIC PANEL WITH 3D PRINTED CELL STRUCTURE SUPPORT LAYER

TECHNICAL FIELD

This disclosure relates to acoustics panels for gas turbine engines.

BACKGROUND

Gas turbine engines used to propel vehicles, e.g., aircraft, often include a fan assembly or propeller that is drive by an engine core. In a fan assembly, the fan may blow air to provide part of the thrust for moving the aircraft. Fan assemblies typically include a bladed wheel mounted to a shaft coupled to the engine core. The bladed wheel of the fan assembly may include a plurality of airfoils in the form of fan blades coupled to a fan disc. Gas turbine engine may also include a fan case that surrounds the fan assembly. An inner surface of the fan case may define an outer wall of the bypass flow path. The inner surface may include one or more front acoustic panels (FAP) and one or more rear acoustic panels (RAP). These acoustic panels are intended to reduce the sound or noise radiating from the gas turbine engine by absorbing some of the sound.

SUMMARY

The disclosure describes acoustic panels, e.g., for fan cases of gas turbine engines, and techniques for forming the acoustic panels. An acoustic panel as described herein may include a coversheet and a three-dimensional (3D)-printed support layer. The support layer may be formed directly on the coversheet using a 3D printing process (also referred to as an additive manufacturing process). The acoustic panels may be relatively lightweight, and the support layer may be sufficiently flexible to elastically deform when struck by objects (e.g., birds, ice, fan blades, or the like) and increase the resistance of the acoustics panels to fracture.

In some examples, this disclosure describes an acoustic panel comprising a coversheet comprising an outer face, an inner face, and a plurality of apertures extending from the outer face to the inner face. The acoustic panel also comprises a plurality of cells comprising a polymer and defining a plurality of cell openings, wherein a first side of the support layer opposite the cell openings is coincident with the inner face of the coversheet, and wherein the 3D printed support layer is 3D printed directly onto the inner face of the coversheet.

In some examples, this disclosure describes a method for forming an acoustic panel, the method comprising 3D printing a support layer directly on an inner face of a coversheet, wherein the coversheet comprises the inner face, an outer face, and a plurality of apertures extending from the inner face to the outer face, wherein the support layer comprises a plurality of cells comprising a polymer and defining a plurality of cell openings, and wherein a first side of the support layer opposite the cell openings is coincident with the inner face of the coversheet.

The details of one or more examples are set forth in the accompanying drawings and the description below. Other features, objectives, and advantages will be apparent from the description and drawings, and from the claims.

BRIEF DESCRIPTION OF DRAWINGS

Reference is made to the attached drawings, wherein elements having the same reference numeral designations represent similar elements throughout.

DETAILED DESCRIPTION

This disclosure generally describes acoustic panels for gas turbine engines and techniques for forming acoustic panels for gas turbine engines. Example acoustic panels employed in turbofan engines may include front acoustic panels (FAP) and rear acoustic panels (RAP).

In operation, acoustic panels may reduce the noise generated by the gas turbine engine. At least some of the sound waves generated by the gas turbine engine may enter the acoustic panels, e.g., through a plurality of apertures in a coversheet of each acoustic panel. The sound waves may bounce around the inside of the support layer and exit the acoustic panels, e.g., through the plurality of apertures in each coversheet. The existing sound waves may be out of phase with the sound waves reflected off of the coversheet and may at least partially cancel out the sound waves through destructive interference.

In operation, acoustic panels may experience impact which may be caused by ice (e.g., separation of ice buildup on the rotating fan), bird ingestion, or the like. Such impacts damage the acoustic panels, which may be referred to as foreign object damage (FOD) and necessitate replacement of the damaged panels, which may be a costly process. To avoid FOD, the example acoustic panels include elements (e.g., the support layer) configured to withstand impact from ice strikes, bird or bird slurry, or the like.

Due to the nature of acoustic panels in gas turbine engines, it can be costly and/or time-consuming to manufacture the acoustic panels using traditional manufacturing techniques. This may be due to cost of setting up the requisite manufacturing tools to manufacture the acoustic panels. By using a 3D printing technique to manufacture the acoustic panels, the amount of time required to set up the manufacturing process can be reduced, and the acoustic panels may be cheaper and/or faster to manufacture.

Figure 1:
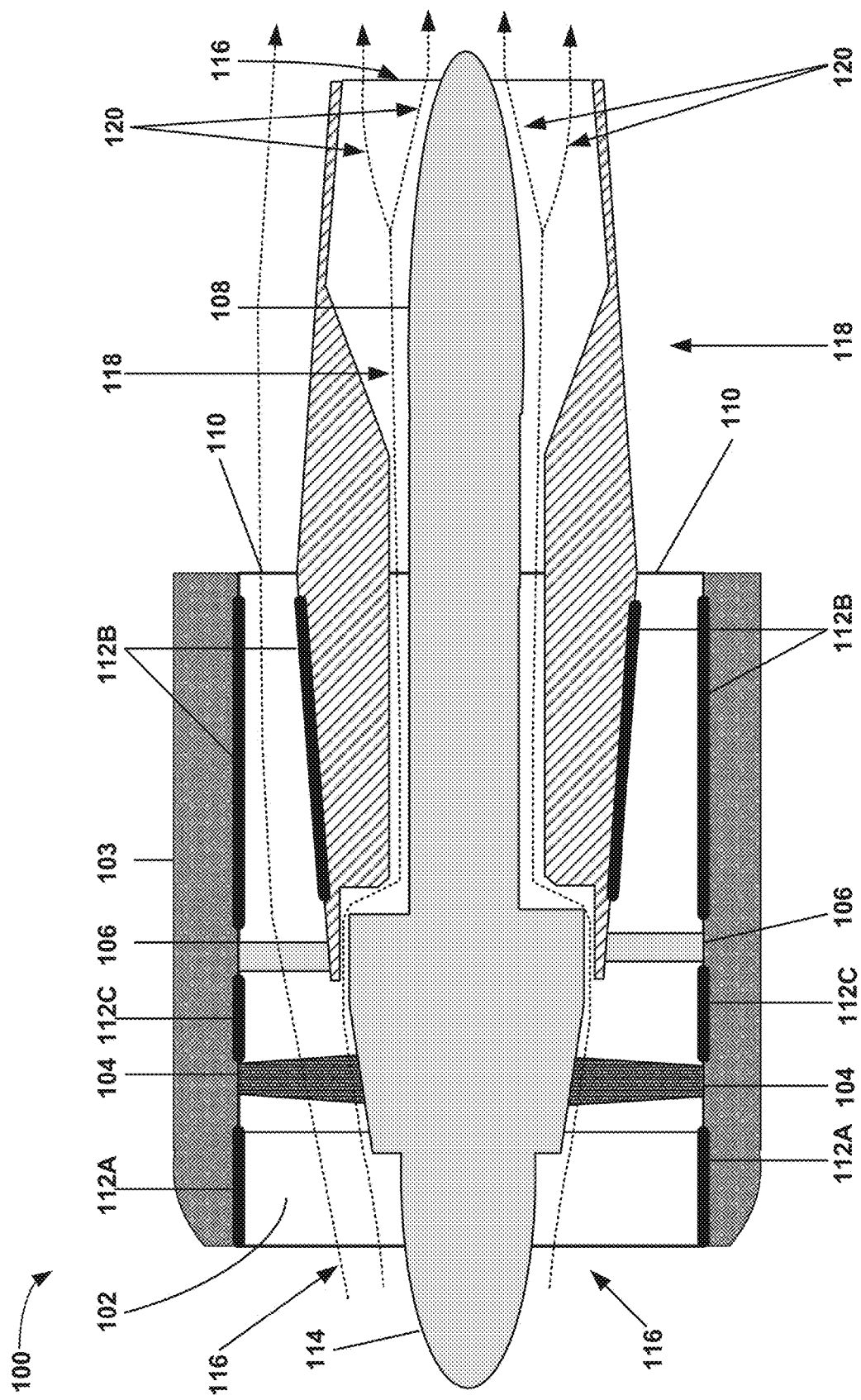
FIG. 1 is a schematic diagram illustrating a longitudinal cross-section view of an example gas turbine engine illustrating the positioning of acoustic panels within the aircraft engine.

FIG. 1 is a schematic diagram illustrating a longitudinal cross-section view of an example gas turbine engine 100 illustrating the positioning of one or more acoustic panels (e.g., acoustic panel 200 of FIG. 2) within gas turbine engine 100. Gas turbine engine 100 may include air intake 102, fan case 103, fan 104, stators 106, core flow system 108, fan bypass 110, engine exhaust duct 116, spinner 114, turbine casing 122, forward acoustic panels (FAP) 112A, and rear acoustic panels (RAP) 112B. Core flow system 108 may include one or more compressors (e.g., intermediate-pressure compressor, high-pressure compressor), a combustion chamber, and one or more turbines (e.g., high-pressure turbine, intermediate-pressure turbine, low-pressure turbine). A bypass system of gas turbine engine 100 may be configured to bypass core flow system 108 and may include fan case 103 and fan bypass 110. Spinner 114 (or nosecone) may be mounted to fan 204.

Thrust, which propels an aircraft, is generated in gas turbine engine 100 by both fan 104 and core flow system 108. Air enters the air intake 102 and flows substantially parallel to longitudinal axis 124, as illustrated by airflow 114. In some examples, airflow 116 may travel around spinner 114 and core flow system 108 and through fan bypass 110. Air may flow past a rotating fan (e.g., fan 104), which increases the air velocity to provide a portion of the thrust. A first portion of airflow 116 may pass fan 104 and enter core flow system 108, while a second portion enters fan bypass 110. Airflow 116 entering core flow system 108 (herein referred to as "airflow 118") may be compressed by one or more compressors, e.g., compressed by an intermediate-pressure compressor and then by a high-pressure compressor. Airflow 118 may then enter a combustion chamber where the air of airflow 118 is mixed with fuel and ignited. Airflow 118 then leaves the combustion chamber with an relatively elevated temperature and pressure and produce work to rotate one or more turbine, e.g., rotating high-pressure turbine, intermediate-pressure turbine, and low-pressure turbine, in succession. Airflow 118 then exits core flow system 108 through engine exhaust duct 116 as exhaust 120. The rotation of the one or more turbines may induce rotation of the one or more compressors and fan 104. Air that passes through fan bypass 110 does not undergo compression or combustion and does not product work to rotate the one or more turbines but may contribute propulsive thrust to gas turbine engine 100. Fan case 103 may be a substantially annular structure around core flow system 108 and fan 104. In some examples, fan case 103 may be a nacelle.

In accordance with examples of this disclosure, at least one FAP 112A and at least one RAP 112B or RAP 112C may be attached to fan case 103. In some examples, as illustrated in FIG. 1, gas turbine engine 100 may include RAP 112B in at least two positions. For example, RAP 112B may be positioned within engine exhaust duct 116 and/or fan bypass 110. FAP 112A may be placed in front of fan 104. In some examples, FAP 112A, RAP 112B, and/or RAP 112C may be a single acoustic panel. For example, FAP 112A may be a single, annular, acoustic panel configured to cover the inner face of fan case 103 around the inner circumference of fan case 103. In other examples, FAP 112A may include two or more acoustic panels 200 configured to be secured to fan case 103 such that the two or more acoustic panels 200 cover the inner face of fan case 103 around the entire inner circumference of fan case 103. FAP 112A may be configured to cover the inner face of fan case 103 between a front face of gas turbine engine 100 and fan 104. FAP 112A may be attached to the inner face of fan case 103 through a plurality of attachment members. In some cases, FAP 112A may be attached directly to an outer casing of fan case 103.

RAP 112B around fan bypass 110 may be secured around an inner surface of fan case 103 or core flow system 108. In some examples, RAP 112B may include one or more acoustic panels 200 configured to cover at least a portion of the rearward inner surface of fan case 103 between stator 106 and a rearward edge of fan bypass 110. In other examples, RAP 112B may include one or more acoustic panels 200 configured to cover at least a portion of an area of the outer surface of core flow system 108 (e.g., a portion of a casing of core flow system 108) between stator 106 and a rearward edge of fan bypass 110.

In other examples, FAP 112A may be positioned in any other area of gas turbine engine 100 that is in front of fan 104. In some examples, RAP 112C may be positioned in any other area of gas turbine engine 100 that is behind fan 104 (e.g., between fan 104 and stator 106).

As described herein, one more of FAP 112A, RAP 112B, and/or RAP 112C of gas turbine engine 100 may constitute an acoustic panel including a coversheet, which includes an outer face, an inner face, and a plurality of apertures extending from the outer face to the inner face, and a 3D printed support member, which includes a plurality of cells comprising a polymer and defining a plurality of cell openings, wherein a first side of the support member opposite the cell openings is coincident with the inner face of the coversheet, and wherein the 3D printed support member is 3D printed directly on the coversheet.

Figure 2:
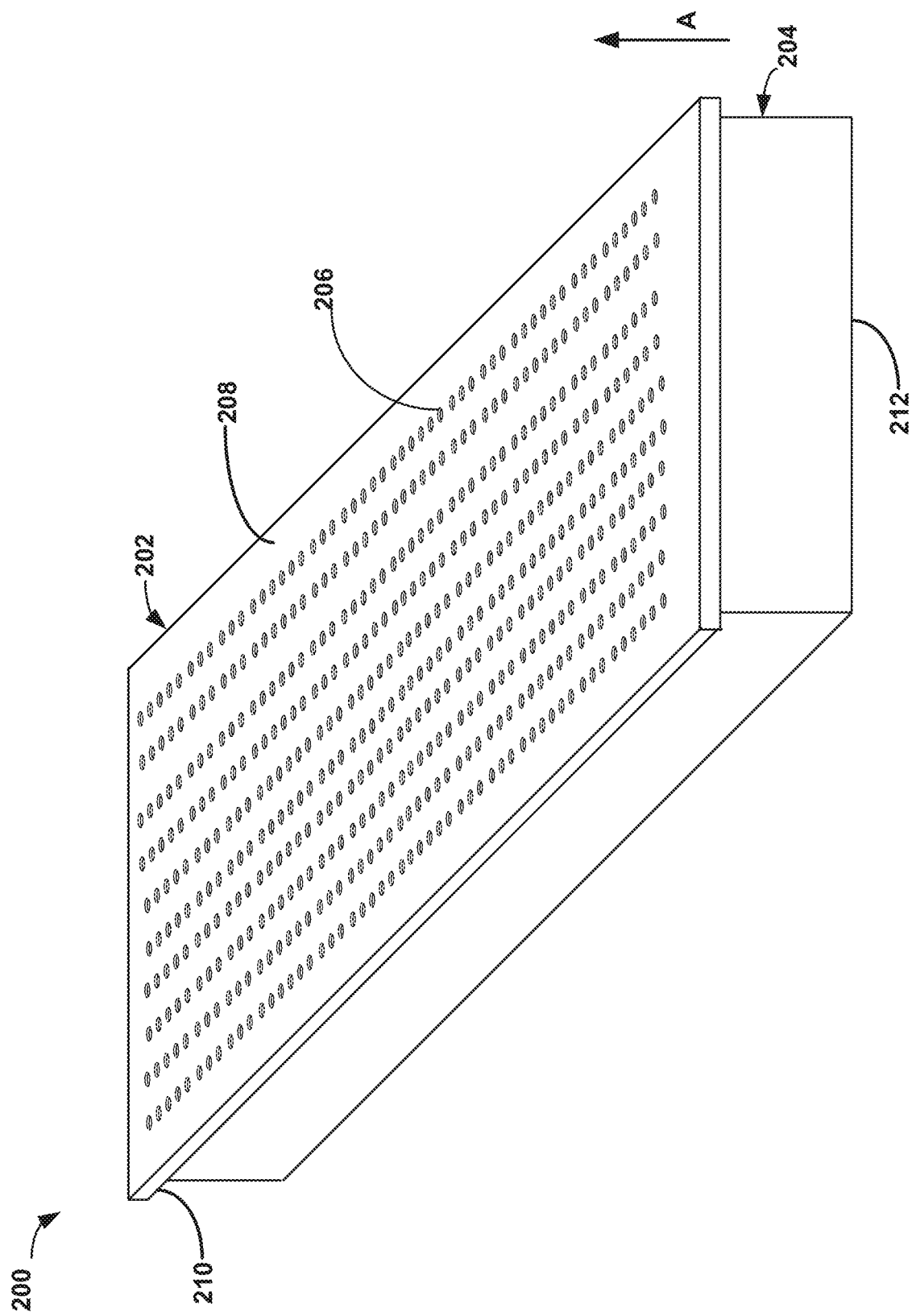
FIG. 2 is a partially schematic illustration of an acoustic panel configured in accordance with some examples of the present disclosure.

FIG. 2 is a partially schematic illustration of an acoustic panel 200 configured in accordance with some examples of the present disclosure. Acoustic panel 200 of FIG. 2 is shown as a flat panel to simplify the illustration. In other examples, acoustic panel 200 may be curved to form the arc of a circle. Acoustic panel 200 includes a coversheet 202 and a support layer 204. Coversheet 202 includes an outer face 208 and an inner face 210. Support layer 204 includes a plurality of cells (e.g., cell 302 of FIG. 3) formed at least partially of a polymer. Coversheet 202 may be positioned on support layer 204 and support layer 204 may provide mechanical support for coversheet 202 and may contribute acoustic properties to acoustic panel 200 by providing a plurality of voids (e.g., the void volumes defined by the plurality of cells) to trap and reflect sound waves. Support layer 204 is directly attached to coversheet 202, e.g., to inner face 210 of coversheet 202, via a first side of support layer 204. Support layer 204 is attached to coversheet 202 by 3D printing support layer 304 directly onto coversheet 202 (e.g., directly onto inner face 210). As shown in FIG. 2, the first side of support layer 204 may be coincident with inner face 210 of coversheet 202 such that at least portion of the first side of support layer 204 is in direct contact with inner face 210. A second side 212 of support layer 204 opposite the first side may include the respective cell openings for each of the plurality of cells. Acoustic panel 200 does not include a back sheet attached or otherwise connect to second side 212 of support layer 204. When incorporated into an example gas turbine engine (e.g., gas turbine engine 100 of FIG. 1), the second side 212 may be coincident to a portion of gas turbine engine 100 such that a portion or all of second side 212 may be covered and coincident to a portion of fan casing 203 or a similar surface of gas turbine engine 100.

Acoustic panel 200 may have a substantially rectangular prism (cuboid) shape, as illustrated in FIG. 2. In other examples, acoustic panel 200 may be formed into other three-dimensional (3-D) shapes to facilitate use of acoustic panel 200 in a gas turbine engine (e.g., gas turbine engine 100). In some examples, acoustic panel 200 may define one or more surfaces (e.g., outer face 208 of coversheet 202) that are substantially planar, as illustrated in FIG. 1. In other examples, acoustic panel 200 may include one or more curved surfaces to facilitate use of acoustic panel 200 in gas turbine engine 100. For example, acoustic panel 200 may be curved such that outer face 208 is concave.

Coversheet 202 may have a sufficiently uniform thickness in a direction parallel to line A such that outer face 208 is substantially parallel to inner face 210. In other examples, at least some portions of coversheet 202 may have substantially different thicknesses to other portions of coversheet 202. For example, coversheet 202 may have a greater thickness in areas near the edges of acoustic panel 200 than in areas away from the edges of acoustic panel 200.

Coversheet 202 may be substantially rigid and configured to withstand FOD without fracture and/or plastic deformation. Coversheet 202 may be manufactured with one or more polymers and/or composite polymers configured to withstand FOD without risk of fracture. In some examples, coversheet 202 may be manufactured with an epoxy matrix material or a composite glass fiber material (e.g., continuous fiber reinforced plastic, a continuous fiber composite). The fibers within the composite glass fiber material may fill up to 70% of the volume of coversheet 202. In other examples, coversheet may include a filled thermoplastics, which are thermoplastics including a fill material. In some examples, the fill material includes chopped fibers. The chopped fibers may include carbon fibers and/or glass fibers. In some examples, the chopped fibers may fill up to 25% of the filled thermoplastic by weight.

In some examples, coversheet 202 may be flexible and configured to withstand FOD by elastically deforming in response to an external force (e.g., from an ice strike, bird strike, or the like). Coversheet 202 may be configured to elastically deform at least partially into one or more cells (e.g., cells 302 of FIG. 3). Coversheet 202 may be manufactured with one or more polymers and thermoplastics used to manufacture support layer 204. The one or more polymers and thermoplastics used to manufacture support layer 204 may include polyether ether ketone (PEEK), polyaryletherketone (PAEK), polyphenylene sulfide (PPS), nylon (e.g., nylon 4-6), heat stabilized nylon, PEAK, or polyamideimide (PAI). In some examples, PPS may be available under the trade name Fortron® available from the Celanese Corporation, Winona, Minnesota. In some examples, PAI may be available under the trade name Torlon®. In some examples, the polymers made include a fill material such as carbon fiber or glass fiber. In some examples, coversheet 202 may be manufactured using one or more 3D printing (also referred to as additive manufacturing) techniques.

Coversheet 202 may define apertures 206 that extend from outer face 208 to inner face 210. Apertures 206 may be configured to allow sound waves through coversheet 202. In some examples, each aperture 206 may have a consistent diameter as aperture 206 extends from outer face 208 to inner face 210. In other examples, apertures 206 may have a varying diameter as aperture 206 extends from outer face 208 to inner face 210. For example, apertures 206 may have a larger and/or smaller diameter at outer face 208 than at inner face 210. In some examples, coversheet 202 may define apertures 206 in a plurality of rows and columns, as illustrated in FIG. 2. In other examples, coversheet 202 may define the plurality of apertures 206 in different configurations (e.g., apertures 206 may be arranged in concentric circles, randomly, or in other repeating geometric configurations). In some examples, apertures 206 may cover up to 205 of the surface area of coversheet 202. Apertures 206 may be formed in coversheet 202 prior to, during, or after attaching support layer 204 to coversheet 202.

Support layer 204 may be substantially rigid in response to the exertion of an external force upon coversheet 202 and may avoid FOD by distributing the external force among a plurality of cell walls (e.g., cell wall 402 of FIG. 5) of support layer 204, thereby reducing the pressure caused by the external force on any single portion of acoustic panel 200. The cells 302 may absorb the impact energy of the external force along an axis orthogonal to coversheet 202. The external force may be the result of an ice strike, bird strike, or the like. For example, support layer 204 may retain its shape in response to the external force and distribute the external force across a plurality of cell walls near the point of impact. In other examples support layer 204 may be configured to elastically deform in response to the external force. In some examples, support layer 204 is configured to withstand vibrations, e.g., from gas turbine engine 100. Support layer 204 may be configured to withstand temperature from about −60 degrees (° C.) to about 120° C.

Figure 3:
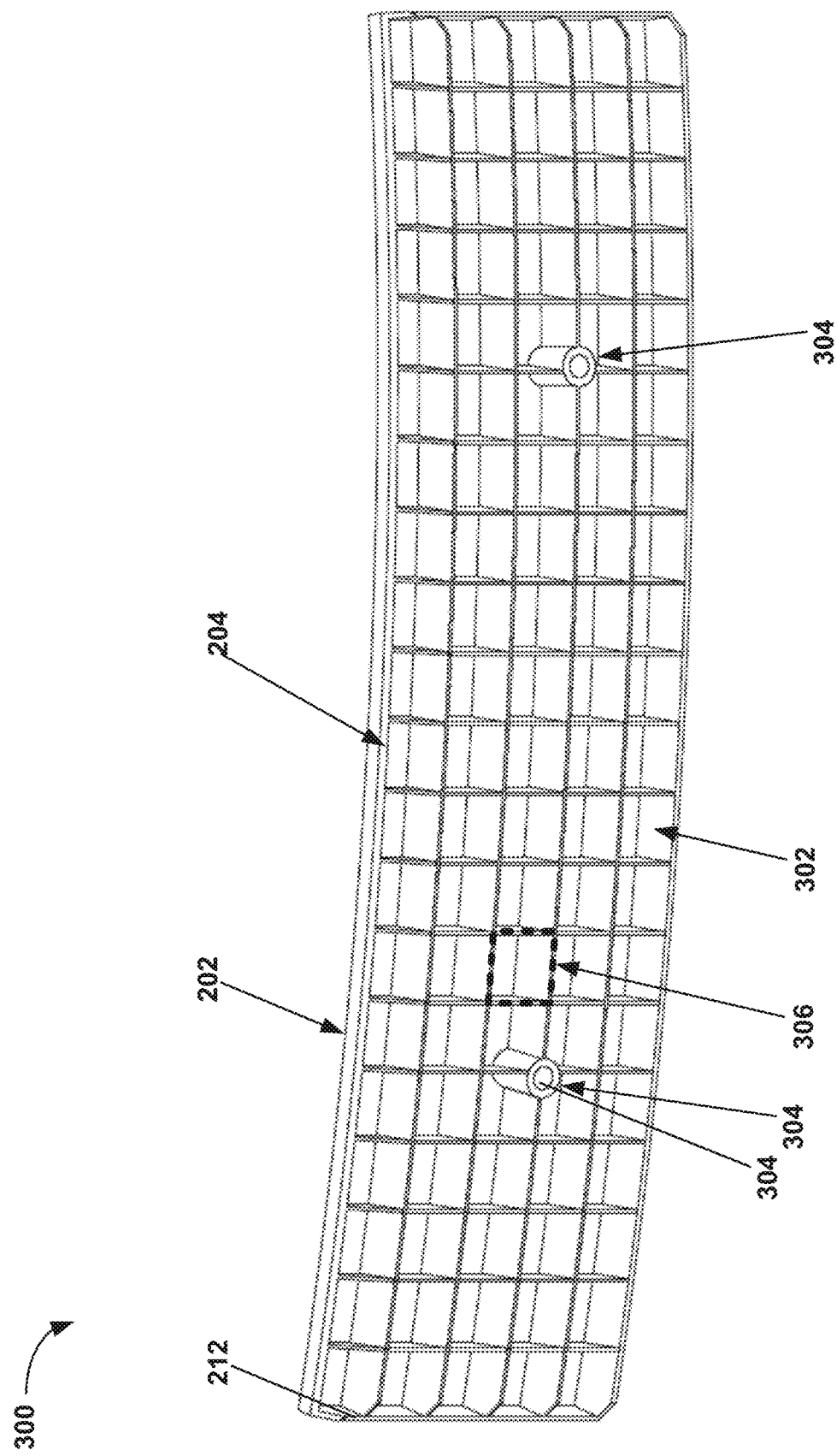
FIG. 3 is a partially schematic diagram illustrating a plurality of cell openings of an acoustic panel.
Figure 5:
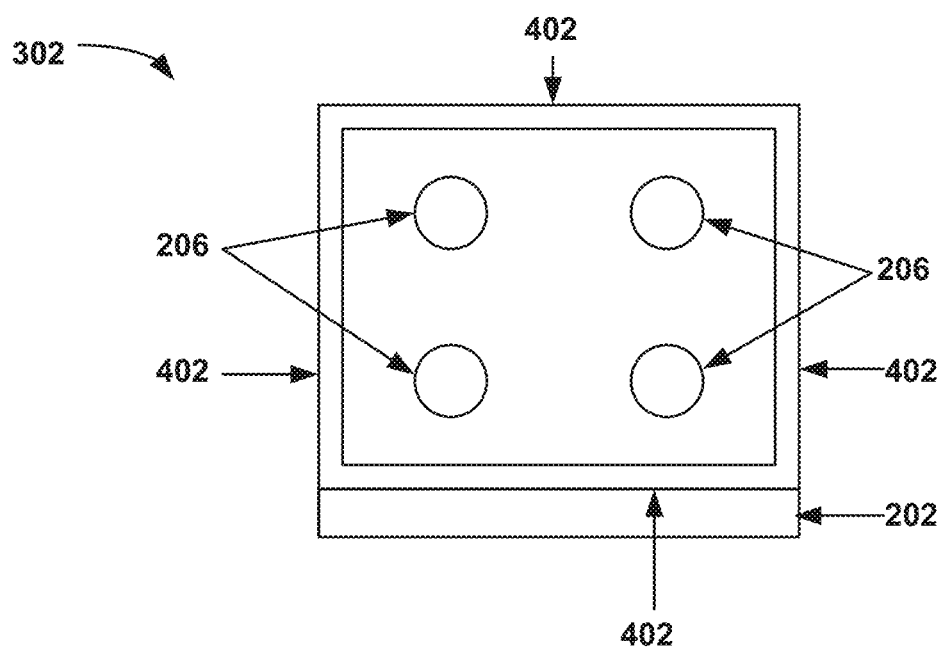
FIG. 5 is a partially schematic diagram illustrating the cell of FIG. 4 from a top view.

Support layer 204 may include one or more polymers and may be manufactured using one or more 3D printing techniques. For example, the polymer material for support layer may be printed/deposited directly onto inner surface 210 of coversheet 202, e.g., in addition to any binder or additive materials used as part of the 3D printing process. Support layer 204 may define the plurality of cells 302 (FIG. 3). Each cell 302 may include a void volume defined by a plurality of cell walls 402 (FIG. 5). A first side of cell 302 is attached to coversheet 202 (e.g., inner face 210 of coversheet 202) and a second side 212 of cell 302 defines a cell opening (e.g., cell opening 404 of FIG. 5). When acoustic panel 200 is attached to fan case 103, cell opening 404 may be covered by the outer surface of fan case 103.

The one or more polymers used to form support layer 204 may be configured to withstand temperatures of about −60° C. to about 120° C. Polymers may include, but are not limited to, thermoplastics including PEEK, PAEK, PPS, nylon, heat stabilized nylon, PEAK, or PAI. The polymers may include a fill material such as carbon fiber or glass fiber. In some examples, the fill material may be a chopped carbon fiber or a chopped glass fiber.

FIG. 3 is a partially schematic diagram illustrating a plurality of cell openings 306 of an acoustic panel 300. Acoustic panel 300 is in a concave configuration, where acoustic panel 300 is curved inwards. In other examples, acoustic panel 300 may have a substantially planar configuration or a convex configuration where coversheet 202 is curved outwards. The various components of acoustic panel 300 including, for example, coversheet 202, support layer 204, and the like may be substantially similar to the components of acoustic panel 200 described in FIG. 2, apart from any differences described below.

Support layer 204 defines a plurality of cells 302 and includes a plurality of attachment members 304. As illustrated in FIG. 3, the second side 212 of support layer 204 includes a plurality of cell openings 306, wherein each cell opening 306 correspond to a respective cell 302 of the plurality of cells 302. Support layer 204 is secured to coversheet 202 such that inner face 210 coversheet 202 is in contact with the entirety of the first side of support layer 204.

Support layer 204 includes a plurality of attachment members 304 configured to secure acoustic panel 200 to portions of gas turbine engine 100, e.g., to the inner face of fan case 103. Attachment members 204 are secured to coversheet, e.g., to inner face 210 of coversheet 202. Acoustic panel 300 may include one, two or three or more attachment members 304. Attachment members 304 may be positioned in portions of acoustic panel 300 where one or more cells 302 of support layer 204 is connected to one or more other cells 302. Attachment members 304 may be positioned equidistant to one or more other attachment members 304 and/or a center point of acoustic panel 300. In other examples, attachment members 304 may be positioned in acoustic panel 300 to correspond to the attachment points on fan case 103 of gas turbine engine 100. Attachment members 304 may include attachment recesses 308 configured to accept a mechanical attachment device (e.g., a bolt, a screw, or the like) to mechanically secure acoustic panel 300 to gas turbine engine 100.

In some examples, support layer 204 is 3D printed directly onto inner face 210 of coversheet 202. In other examples, where coversheet 202 is configured to elastically deform, support layer 204 and coversheet 202 may be 3D printed together in a single process (e.g., with material initially being deposited on a layer by layer basis to form coversheet 202 followed by the layer by layer deposition of a material (that is the same or different from the material of the coversheet) to form support layer 204.

Figure 4:
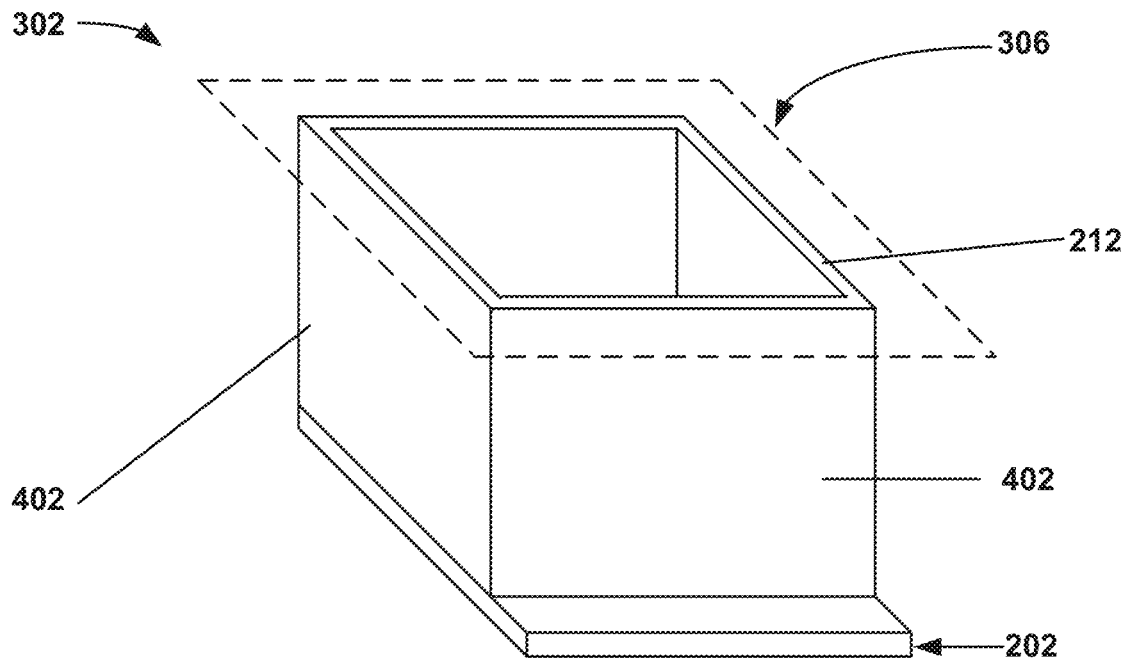
FIG. 4 is a partially schematic diagram illustrating a cell of the example acoustic panel of FIG. 2.

FIGS. 4 and 5 illustrate cell 302 of acoustic panels (e.g., acoustic panel 200, acoustic panel 300). FIG. 4 is a partially schematic diagram illustrating a cell 302 of the example acoustic panel 200 of FIG. 2. FIG. 5 is a partially schematic diagram illustrating cell 302 of FIG. 4 from a top view.

As illustrated in FIGS. 4 and 5, cell 302 is defined by a plurality of cell walls 402 (e.g., four cell walls 402). Cell 302 may be a rectangular prism, as illustrated in FIGS. 4 and 5, or any other geometric prism (e.g., a triangular prism, hexagonal prism, octagonal prism). In some examples all cells 302 of support layer 204 are the same type of geometric prism (e.g., cells 302 are all rectangular prisms). In other examples, at least some of the cells 302 are a different type of geometric prism than other cells 302 (e.g., some cells 302 are hexagonal prisms while other cells 302 are trapezoidal prisms). Each cell 302 may include a plurality of apertures 206 of coversheet 202. In some examples, each cell 302 may include the same number of apertures 206. In other examples, at least some of the cells 302 includes a different number of apertures 206 than another of the cells 302.

The thickness of coversheet 202 may vary based on the strength of the material of coversheet 202, the design of support layer 204 and cells 302, the curvature (e.g., the radius of curvature) of acoustic panel 200, and/or the diameter of gas turbine engine 100. For example, acoustic panels 200 on gas turbine engine 100 with a relatively larger diameter may be struck by relatively larger pieces of ice and coversheet 202 may need to be relatively thicker to withstand the impact. In some examples, coversheet 200 may have a thickness of between about 0.5 mm to about 3 mm.

In some examples, all cell walls 402 of support layer 204 may have a uniform height. In other examples, cell walls 402 of support layer 204 may have different heights based on the position of cell walls 402 within support layer 204. For example, cell walls 402 positioned on the peripheral portions of support layer 204 may have lower or higher cell walls 402 relative to other cell walls 402 positioned in the center of support layer 204. In some examples, cell walls 402 may have a height of between about 20 mm to about 40 mm. In some examples, cell walls 402 across a single layer 204 may vary from about 25 mm to about 30 mm or from about 30 mm to about 40 mm.

Figure 6:
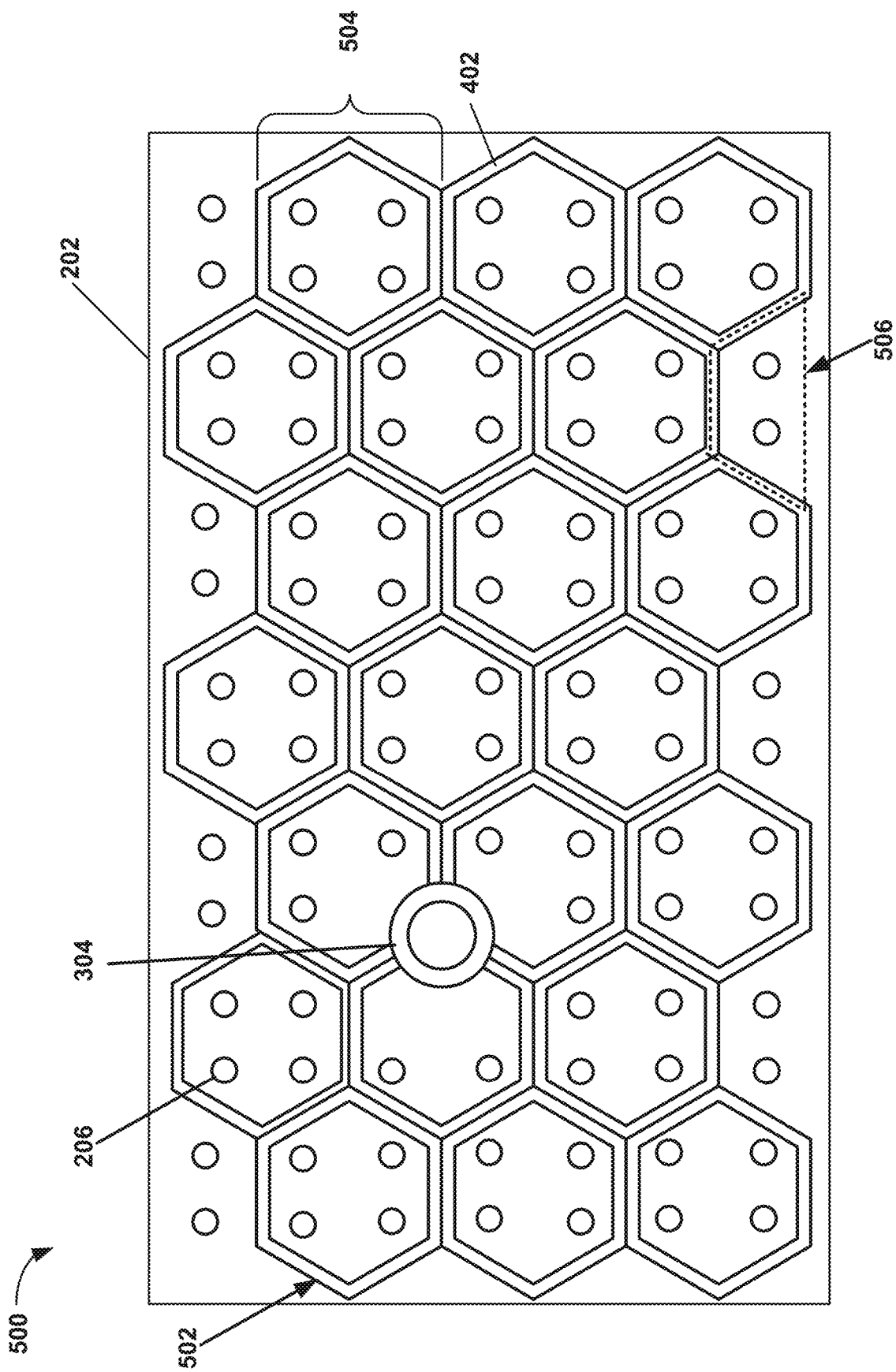
FIG. 6 is a partially schematic diagram illustration of an acoustic panel with a different support layer from a point-of-view along line A of FIG. 2.

FIG. 6 is a partially schematic diagram illustration of an acoustic panel 500 with a different support layer 502 from a point-of-view along line A of FIG. 2. Support layer 502 includes attachment member 304 and a plurality of hexagonal prism 504. Each hexagonal prism 504 is defined by six hexagonal prisms 402. In some examples, support layer 502 may include trapezoidal prisms 506, each of which may be joined with a trapezoidal prism 506 of an adjacent acoustic panel 500 to form a hexagonal prism 504.

Figure 7:
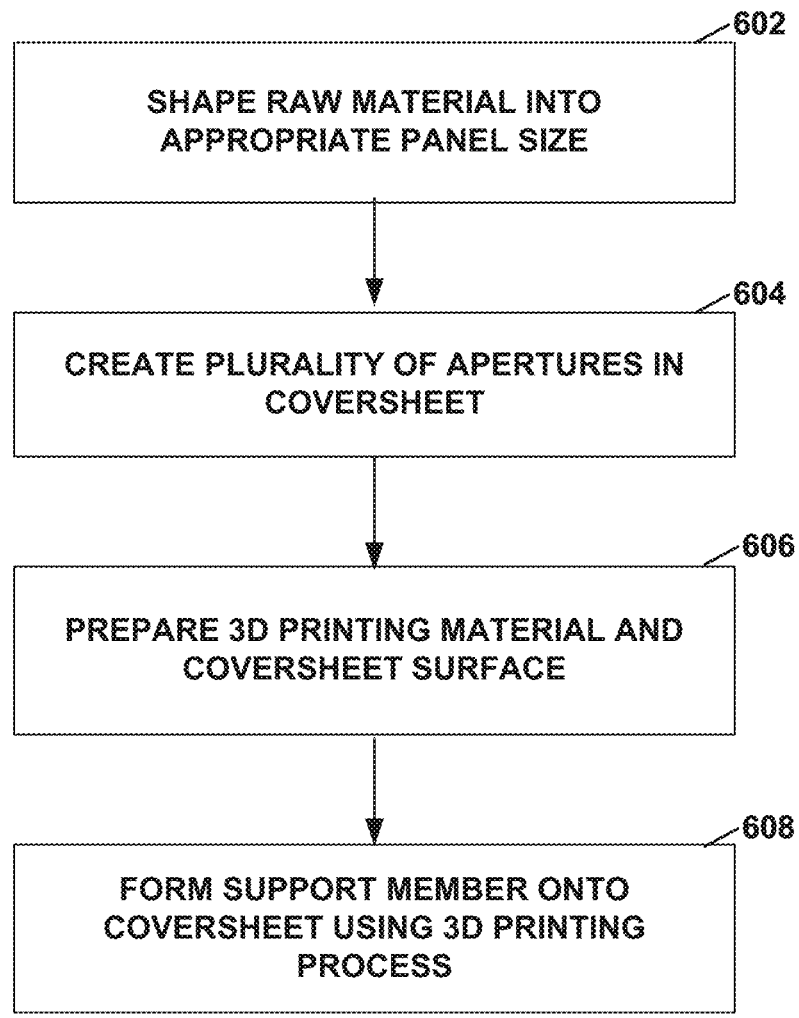
FIG. 7 is a flowchart illustrating an example method for manufacturing an acoustic panel in accordance with some examples of the present disclosure.

FIG. 7 is a flowchart illustrating an example method for manufacturing an acoustic panel (e.g., acoustic panel 200) in accordance with some examples of the present disclosure.

The process of FIG. 7 includes shaping a raw material into a coversheet (e.g., coversheet 202) for an acoustic panel (602). The method of forming the raw material into the coversheet will depend on the type of raw material. For example, a thermoplastic material with a relatively low amount of fiber reinforcing may be acquired as a pre-formed thin sheet, heated, and then plastically deformed into the desired shape for the coversheet. In other examples, the pre-formed thin sheet may be heated and then elastically deformed into the desired shape for the coversheet. In other examples, a raw material that is a non-cured thermoset plastic (e.g., epoxy including fiber reinforcing) may be cured on a mold surface to the desired shape. With a relatively thin desired shape for the coversheet, the process of FIG. 7 includes first curing the raw material on a flat surface and latter applying a force to plastically deform the cured raw material. The process of FIG. 7 may involve the use of any suitable techniques for plastic fabrication or other relevant technologies. The process of FIG. 7 may involve the use of a particular technique based on the particular type of the raw materials. Raw materials may be shaped into coversheet 202 by removing (e.g., with a cutting instrument) portions of the coversheet material to form the coversheet material into the proper dimensions of coversheet 202 and to form the apertures (e.g., aperture 206). In some examples, raw materials may be bent into an appropriate shape (e.g., convex shape, concave shape) by exerting heat and/or pressure to the raw material. Coversheet material may be shaped into a plurality of shapes configured to fit into a particular position on gas turbine engine 100 (e.g., any portion of FAP 112A, RAP 112B, and/or RAP 112C as illustrated in FIG. 1).

The process of FIG. 7 also includes creating a plurality of apertures (e.g., apertures 206) in coversheet 202 (604). Apertures 206 may be created using any suitable technique. In some examples, apertures 206 may be created using a puncturing instrument or a cutting instrument. In some examples, apertures 206 may be created as part of shaping coversheet material into coversheet 202 (602). In other examples, apertures 206 may be created as part of creating the coversheet material prior to shaping coversheet material into coversheet 202 (602).

As shown in FIG. 7, the example process includes preparing a 3D printing material and the surface of coversheet 202 (e.g., inner face 210 of coversheet 202) (606). The material used in the 3D printing process may include the one or more polymers used to create a support layer of acoustic panel 200 (e.g., support layer 204) in a medium configured to be used in a 3D printing technique (e.g., in the form of a powder and/or a filament including the desired material). The preparation of inner face 210 may function to enable attachment of support layer 204 to inner face 210 when support layer 204 is formed onto inner face 210 via a 3D printing technique. In some examples, the preparation of inner face 210 includes cleaning inner face 210 with a solution or removing extrusions or other materials to remove any conditions that may hamper the 3D printing or attachment of support layer 204 onto coversheet 202.

As shown in FIG. 7, the example processes also including forming support layer 204 onto coversheet 202 (e.g., inner face 210 of coversheet 202) using a 3D printing process (608). For example, the 3D printing process may include depositing a first layer of material (e.g., using a 3D print head) onto inner face 210 of coversheet and then iteratively depositing additional layers to build on the first layer of material until the combined layers form support layer 204 (e.g., once the 3D printing process has deposited the material layers such that the combined layers exhibit the desired geometry of support layer 204. In some examples, each layer of material may be formed from one or more tracks (or rows) of material deposited along approximately the same plane by a print or deposition head of a 3D printing apparatus.

Any suitable 3D printing techniques may be employed to form support layer 204. Example techniques may include, e.g., a blown powder technique, a powder bed fusion technique, or a fused deposition modeling technique. In some examples, the 3D printing process may include iteratively depositing layers of 3D printing material onto a printing surface (e.g., coversheet 202) through a 3D printing device to form a three-dimensional object.

Blown powder techniques may involve outputting a powder from a printer head and using a laser or other energy source attached or separate from the printer head to fuse the powder together as a track of material on coversheet 202. Respective layers of material that are built upon in the layer by layer process may be made of one or more tracks of material. In some examples, the powder used in the blown powder techniques may include any of the plurality of polymers that may be used to form support layer 204.

Fused deposition modeling techniques may include extruding a filament through a heated printer head onto a printing surface. The deposited material may solidify to form the individual layers of material that combine to form support layer 204. The filament used in fused deposition modeling techniques may include any of a plurality of polymers that may be used to form support layer 204.

Powder bed fusion techniques may include depositing a layer of the powdered 3D printing material onto a printing surface and melting the powdered material to form the individual layers of material that combine to form support layer 204. The filaments used in powder bed fusion techniques may include any of a plurality of polymers that may be used to form support layer 204.

In some examples, where coversheet 202 is formed from the same one or more polymers as support layer 204, panel 200 may be formed by forming coversheet 202 and apertures 206 using the 3D printing techniques described above prior to forming support layer 204 onto coversheet 202 (608). In some examples, coversheet 202 and support layer 204 may be formed in separate 3D printing sessions. In other examples, coversheet 202 and support layer 204 may be 3D printed in a single session.

The above detailed descriptions of examples of the technology are not intended to be exhaustive or to limit the technology to the precise form disclosed above. Although specific examples of the technology are described above for illustrative purposes, various equivalent modifications are possible within the scope of the technology, as those skilled in the relevant art will recognize. For example, while steps are presented in a given order, alternative examples may perform steps in a different order. The various examples described herein may also be combined to provide further examples. All references cited herein are incorporated by reference as if fully set forth herein.

Clause 1: an acoustic panel comprising: a coversheet comprising: an outer face; an inner face; and a plurality of apertures extending from the outer face to the inner face; and a 3D printed support layer comprising: a plurality of cells comprising a polymer and defining a plurality of cell openings, wherein a first side of the support layer opposite the cell openings is coincident with inner face of the coversheet, and wherein the 3D printed support layer is 3D printed directly onto the inner face of the coversheet.

Clause 2: the acoustic panel of clause 1, wherein each of the plurality of cells has a substantially square cross-sectional shape.

Clause 3: the acoustic panel of clauses 1 or 2, wherein the support layer is configured to absorb impact energy from the coversheet through the plurality of cells along an axis substantially orthogonal to the outer face of the coversheet.

Clause 4: the acoustic panel of any of clauses 1-3, wherein the 3D printed support layer comprises a filled thermoplastic.

Clause 5: the acoustic panel of clause 4, wherein the filled thermoplastic comprises polyaryletherketone.

Clause 6: the acoustic panel of any of clauses 1-5, wherein the 3D printed support layer further comprises a plurality of attachment members, and wherein each of the plurality of attachment members is positioned at an attachment point where one or more of the plurality of cells is coincident to another of the plurality of cells.

Clause 7: the acoustic panel of any of clauses 1-6, wherein the coversheet comprises a second polymer, and wherein the coversheet is 3D printed.

Clause 8: the acoustic panel of clause 7, wherein the polymer comprises a continuous fiber composite.

Clause 9: the acoustic panel of clauses 7 or 8, wherein the support layer is configured to elastically deform in response to a compressive force on the outer face of the coversheet.

Clause 10: the acoustic panel of any of clauses 1-9, wherein the outer face of the coversheet comprises a thermoset polymer with fiber reinforcements.

Clause 11: a method for forming an acoustic panel, the method comprising 3D printing a support layer directly on an inner face of a coversheet, wherein the coversheet comprises the inner face, an outer face, and a plurality of apertures extending from the inner face to the outer face, wherein the support layer comprises a plurality of cells comprising a polymer and defining a plurality of cell openings, and wherein a first side of the support layer opposite the cell openings is coincident with the inner face of the coversheet.

Clause 12: the method of clause 11, wherein each of the plurality of cells has a rectangular cross-sectional shape.

Clause 13: the method of clauses 11 or 12, wherein the support layer is configured to absorb impact energy from the coversheet through the plurality of cells along an axis substantially orthogonal to the outer face of the coversheet.

Clause 14: the method of any of clauses 11-13, wherein the support layer further comprises a filled thermoplastic.

Clause 15: the method of clause 14, wherein the filled thermoplastic comprises polyaryletherketone.

Clause 16: the method of any of clauses 11-15, wherein the support layer comprises a plurality of attachment members, and wherein each of the plurality of attachment members is positioned at an attachment point where one or more of the plurality of cells is coincident to another of the plurality of cells.

Clause 17: the method of any of clauses 11-16, wherein the coversheet comprises a continuous fiber composite.

Clause 18: the method of any of clauses 11-17, wherein the coversheet comprises a second polymer, and wherein the coversheet is 3D printed.

Clause 19: the method of clause 18, wherein the second polymer comprises a continuous fiber composite.

Clause 20: the method of clauses 18 or 19, wherein the support layer is configured to elastically deform in response to a compressive force on the outer face of the coversheet.

Clause 21: the method of any of clauses 11-20, wherein the outer face of the coversheet comprises a thermoset polymer with fiber reinforcements.

What is claimed is:

1. An acoustic panel comprising:
    a coversheet comprising:
        an outer face;
        an inner face; and
        a plurality of apertures extending from the outer face to the inner face; and
    a three-dimensionally (3D) printed support layer comprising a plurality of cells comprising a polymer and defining a plurality of cell openings, wherein a first side of the support layer opposite the cell openings is coincident with the inner face of the coversheet, wherein the 3D printed support layer is 3D printed directly onto the inner face of the coversheet, and
    wherein the coversheet is configured to elastically deform into one or more cells of the plurality of cells of the 3D printed support layer in response to a compressive force on the outer face of the coversheet.

2. The acoustic panel of claim 1, wherein each of the plurality of cells has a substantially square cross-sectional shape.

3. The acoustic panel of claim 1, wherein the support layer is configured to absorb impact energy from the coversheet through the plurality of cells along an axis substantially orthogonal to the outer face of the coversheet.

4. The acoustic panel of claim 1, wherein the 3D printed support layer comprises a filled thermoplastic.

5. The acoustic panel of claim 4, wherein the filled thermoplastic comprises polyaryletherketone.

6. The acoustic panel of claim 1, wherein the 3D printed support layer further comprises a plurality of attachment members, and wherein each of the plurality of attachment members is positioned at an attachment point where one or more of the plurality of cells is coincident to another of the plurality of cells.

7. The acoustic panel of claim 1, wherein the coversheet comprises a second polymer, and wherein the coversheet is 3D printed.

8. The acoustic panel of claim 7, wherein the second polymer comprises a continuous fiber composite.

9. The acoustic panel of claim 1, wherein the 3D printed support layer is configured to be substantially rigid in response to the compressive force on the outer face of the coversheet.

10. The acoustic panel of claim 1, wherein the outer face of the coversheet comprises a thermoset polymer with fiber reinforcements.

11. A method for forming an acoustic panel, the method comprising:
    3D printing a support layer directly on an inner face of a coversheet, wherein the coversheet comprises the inner face, an outer face, and a plurality of apertures extending from the inner face to the outer face, wherein the support layer comprises a plurality of cells comprising a polymer and defining a plurality of cell openings, wherein a first side of the support layer opposite the cell openings is coincident with the inner face of the coversheet, and wherein the coversheet is configured to elastically deform into one or more cells of the plurality of cells of the 3D printed support layer in response to a compressive force on the outer face of the coversheet.

12. The method of claim 11, wherein each of the plurality of cells has a rectangular cross-sectional shape.

13. The method of claim 11, wherein the support layer is configured to absorb impact energy from the coversheet through the plurality of cells along an axis substantially orthogonal to the outer face of the coversheet.

14. The method of claim 11, wherein the support layer further comprises a filled thermoplastic.

15. The method of claim 14, wherein the filled thermoplastic comprises polyaryletherketone.

16. The method of claim 11, wherein the support layer comprises a plurality of attachment members, and wherein each of the plurality of attachment members is positioned at an attachment point where one or more of the plurality of cells is coincident to another of the plurality of cells.

17. The method of claim 11, wherein the coversheet comprises a continuous fiber composite.

18. The method of claim 11, wherein the coversheet comprises a second polymer, and wherein the coversheet is 3D printed.

19. The method of claim 18, wherein the second polymer comprises a continuous fiber composite.

20. The method of claim 11, wherein the 3D printed support layer is configured to be substantially rigid in response to the compressive force on the outer face of the coversheet.

* * * * *